United States Patent Office 3,285,591
Patented Nov. 15, 1966

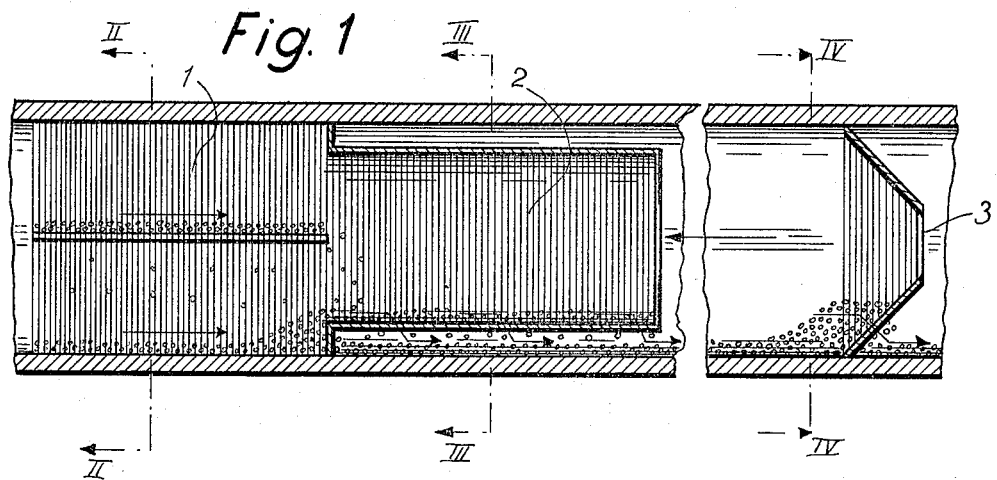
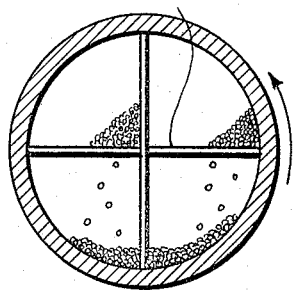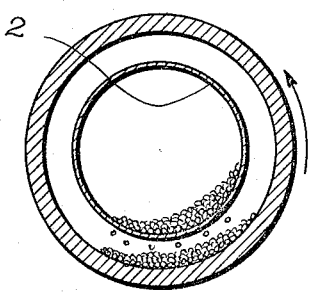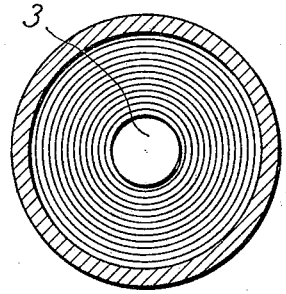
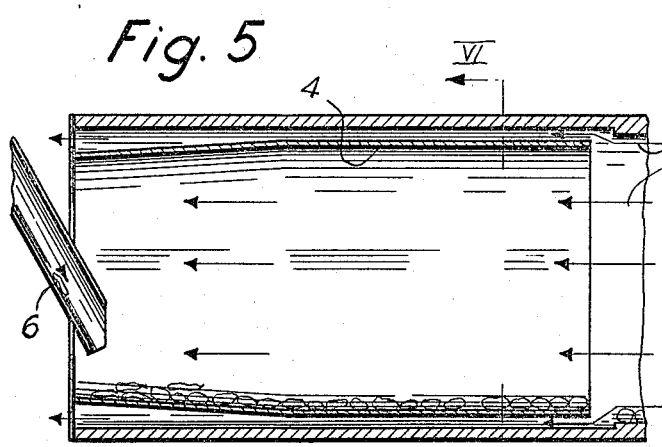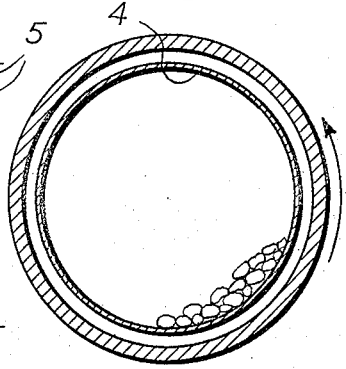

3,285,591
ROTARY KILNS
Harry Kamstrup-Larsen, Vestergade 16,
Copenhagen, Denmark
Filed July 5, 1963, Ser. No. 295,277
1 Claim. (Cl. 263—33)

This is a continuation-in-part of application Serial No. 83,312, filed January 17, 1961, now abandoned.

The present invention relates to a rotary kiln for the practice of a process by which is produced, by burning wet plastic clay, a light-weight product in the form of rounded grains with honeycombed structure of the order of size 0.5–3 cm.

The process is to the effect that after drying of a clay suitable for the purpose this is heated to beginning melting whereby in the interior of the clay, at a time where the melting starts, gases are developed which cause the individual pieces of clay to swell, and the honeycombed structure will appear.

In this manner it has been possible to make products having the shape of rounded grains of little water absorption and a low unit weight, for instance about 300 kgs. per cubic meter. Such a product is for instance appropriate as an aggregate in light-weight concrete and for the production of light-weight bricks and other construction elements, cement being for instance used as binding agent. An important property of the product in question is constituted by its outstanding insulating ability against heat, cold, and sound, and also by its markedly high compression strength in proportion to its low unit weight.

It is known that for the production of such material the clay in the form of pre-shaped little balls can be fed to a drying and burning kiln, which can be of a type similar to the rotary kilns used in the manufacture of cement.

It is also known that it is possible to obtain the desired material by feeding the wet clay in the form of lumps or flakes without any special shape to such a rotary kiln in which case the clay may have been pre-treated in a homogenising plant of the type used in the brickworks industry and the clay may here have been mixed with substances regulating the melting or the bloating or both.

Likewise it is known that the rotary kiln used in the last case with big economical advantage can be divided in an independent drying kiln and an independent burning kiln with individual adjustment of the speed of rotation.

For obtaining the best conditions in the burning zone of the kiln and thereby increase its production it is important that no dustlike fraction enters the burning zone, and for the kilns being fed with lumps of wet clay the amount of dust can according to the invention be reduced to practically nothing by the installation of grates or screens in the drying zone of the kiln which grates or screens for some will retain lumps of clay of undesirable big size.

In order to facilitate the understanding of the present invention a more explicit account will be given as to some of the processes which the clay is experiencing on its way through the kiln plant from its insertion in the wet plastic condition at the top end till it leaves the kiln as the finished product.

In the drying or calcining zone of the kiln unit substantial amounts of water are given off; however, chiefly from the extreme surface layer of the lumps or flakes only, so that the interior of the lumps of clay remain pretty unaffected by this disengagement of water.

Now the present invention is based upon the observation that a lump of clay, when subjected to the drying process mentioned above, only dries purely superficially in such a manner that the suface layer splits into small pieces which will gradually loosen from the wet interior of the lump of clay. In order to obtain the desired product it is important here that this dividing or splitting and descaling of the surface layer of the lumps of clay take place into pieces of adequate size.

This can be attained by ensuring that the drying out takes place with a certain speed, as experience has shown that lumps of clay which are dried very slowly do not disintegrate at all during the drying, while lumps of clay by very fast drying are inclined to burst or explode into numerous very small, even dust-like, pieces on account of the rapid development of steam in the interior of the lumps.

According to the invention lumps of clay of undesirable size can be retained for a time in that part of the kiln, where the temperature provides a suitable slow drying and consequently a scaling of the surface to clay pieces of suitable size by arranging grates or screens in the drying zone of the rotary kiln. The said grates or screens may be designed in different ways, for instance they may be arranged radially in the kiln subdividing the cross-section of this into a number as sectors, for instance into quadrants. The clearance between the grate bars or the mesh of the sieves will determine the size of the pieces of clay which by the rotation of the kiln can pass through the grates or screens from sector to sector and thereby proceed more rapidly through the kiln than the pieces of clay retained in one sector of the kiln.

According to the invention, the grates or screens may also be designed as cylindrical screens arranged concentrically in the kiln so that when the clay is introduced into these, the smaller pieces of clay passing through the openings in the screens from the inside and outwards.

Finally, according to the invention, the grates or screens may consist of perforated walls arranged crosswise to the interior of the kiln, the said walls being possible shaped as cones with their points facing the burning zone of the kiln. It is not necessary to screen off the entire cross-section of the kiln in this manner, since the wall according to the invention may have a central hole of a diameter small enough to secure that the items to be burned will not reach to the edge of the hole.

The components thus built in will also speed up the disengagement of water from the clay, seeing that, as will be known, an essential part of the heat in the kiln-exit gasses is not transferred directly to the items to be dried, but is transferred to these through contact with the interior of the kiln. As will be known, this heat transfer is frequently accelerated by increasing the inner surface of the kiln, for instance by hanging chains. Such measures can also be taken in connection with the kiln involved here, but the built-in items according to the invention, too, will convey heat and thereby further the giving-off of water and the subsequent splitting of the clay into the desired smaller pieces.

A particularly appropriate design for such grates is shown in the drawing, where FIGURE 1 shows a longitudinal section of the drying zone in a design of a kiln unit suitable for working of the process in question;

FIGURE 2 is a cross-section on the line II—II of FIGURE 1;

FIGURE 3 is a cross-section on the line III—III of FIGURE 1;

FIGURE 4 is a cross-section on the line IV—IV of FIGURE 1;

FIGURE 5 is a longitudinal section through the charging end of the kiln with built-in casing; and FIGURE 6 the same in cross-section on the line VI—VI of FIGURE 5.

As it appears from the drawing the built-in grates or screens consist first of the formerly mentioned radially arranged grates or screens 1 which divide the interior of the kiln into sectors, here into quadrants. A cylinder 2 built up from a circular course of iron bars which together act as a cylindrical screen, and finally a cone or taper section 3 built up from circular rings, and the point of which is facing the exit end for the items burnt. The cylinder 2 might also be built from a longitudinal course of bars.

Besides with these grates the kiln as previously mentioned may be fitted in a properly speaking well-known manner with chains at suitable places. It may also be provided with damming units of various kinds, for instance in the form of possibly inclined shovels protruding from the inner wall of the kiln.

With a view to obtaining regular feeding to the various zones of the kiln, it is important that the fresh introduced wet clay do not adhere to the kiln wall near the charging end where the clay is extremely wet and forms particularly big lumps which will loosen now and then, thereby impeding regular feeding of the kiln farther onwards. This drawback, according to a further design of the invention, is overcome by building into this end of the kiln, concentrically at an adequate distance from the kiln wall, a casing of heat-conductive material, for instance sheet iron, in the form of a cylinder or slender cone, and in such a manner that the exit gases 5, prior to leaving the kiln, can pass inside as well as around the said casing. The clay 6 is then filled into this casing, the temperature of which is kept so high by the exit gases 5 passing around the outer surface that the tendency of the clay to adhere will be reduced. On the drawing this casing is indicated by the numeral 4.

Having described my invention, what I claim is:

A rotary, cylindrical kiln, for the production of lightweight material in the form of rounded grains of honeycombed structure, through heating of wet, plastic clay to incipient melting, which has a drying zone having in its entry portion screens which are radially arranged, dividing the zone into sectors, then a cylinder forming a cylindrical screen, and finally a cone of circular rings, its point facing the exit of the drying zone.

References Cited by the Examiner

UNITED STATES PATENTS

| | | | |
|---|---|---|---|
| 2,683,594 | 12/1951 | Martenson et al. | 263—33 |
| 3,076,270 | 8/1958 | Madsen | 263—33 |

FOREIGN PATENTS

| | | |
|---|---|---|
| 948,774 | 2/1949 | France. |

FREDERICK L. MATTESON, JR., *Primary Examiner.*

CHARLES SUKALO, WILLIAM F. O'DEA,
*Examiners.*

D. A. TAMBURRO, *Assistant Examiner.*